Feb. 23, 1932.  A. W. KIMBELL ET AL  1,846,735
FLUSH TYPE CURTAIN FASTENER
Filed Feb. 24, 1926

Inventor
Arthur H. Kimbell and
Carl L. Knutson

Witness
Martin H. Olsen

Patented Feb. 23, 1932

1,846,735

UNITED STATES PATENT OFFICE

ARTHUR W. KIMBELL, OF CHICAGO, AND CARL L. KNUTSON, OF VILLA PARK, ILLINOIS, ASSIGNORS TO CINCH MANUFACTURING CORPORATION, OF CHICAGO, ILLINOIS, A CORPORATION OF ILLINOIS

FLUSH TYPE CURTAIN FASTENER

Application filed February 24, 1926. Serial No. 90,248.

Our invention has to do with the sockets of flush type fasteners for the curtains of automobiles, and more particularly with such sockets for use in connection with the sheet or thin metal parts of automobiles. In applying sockets of the flush type to such structures, the metal plate or other portion of the structure which is to receive the socket is bored at the proper position to form a hole of a diameter approximately that of the exterior of the socket. The socket, which is ordinarily formed with a flange about its opening, is then thrust into the opening until its flange is against the face of the supporting member and provision of some kind is made for preventing the socket slipping out of the opening. Our invention relates to a form of socket, the side wall or barrel of which may be readily expanded after the socket is in place in the opening in the support to prevent the accidental withdrawal of the socket.

Figure 1:
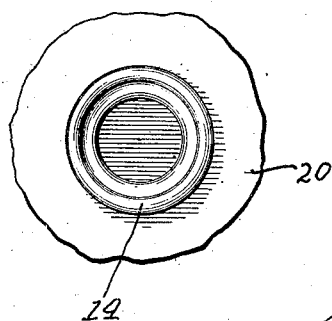
Figure 2:
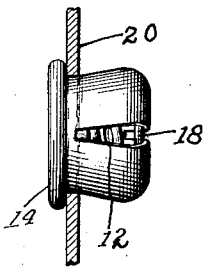
Figure 3:
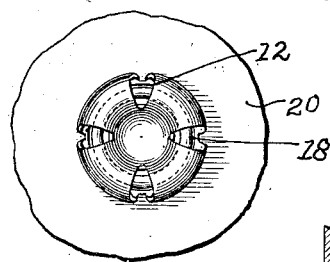
Figure 4:
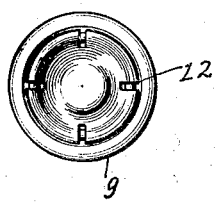
Figure 5:
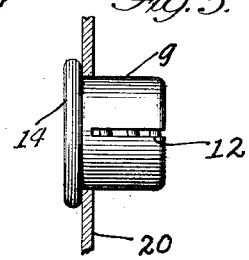
Figure 6:
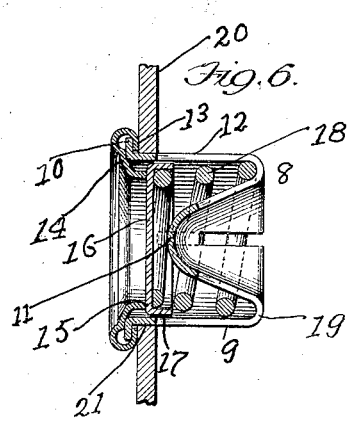
Figure 7:
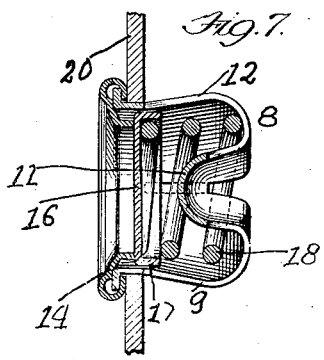

In the drawings accompanying and forming a part of this specification, Figure 1 is a front view of a socket in place in its support; Fig. 2 is a side elevation showing the sheet or thin metal support in section; Fig. 3 is a rear view of the socket after it has been secured in the opening in the support; Fig. 4 is a rear view of the socket in unexpanded condition; Fig. 5 is a side elevation similar to Fig. 2 but showing the socket in unexpanded condition; Fig. 6 is a vertical axial section through a socket in position in its support but prior to expansion thereof; and Fig. 7 is a similar view with the socket expanded.

As best shown in Figs. 4, 5 and 6, the socket, as a manufactured article and before it has been applied to the structure in which it is designed to be used, comprises a cup 8 having a substantially cylindrical side wall 9 and a lip flange 10. The bottom wall of the hub is upset or punched inwardly to form a bump or projection 11 which extends toward the mouth of the cup. The wall of the cup is longitudinally slitted as at 12, the slits terminating somewhat short of the lip of the cup at one end and extending into the dished in or humped portion of the bottom at the other, but terminating short of the central point of the bottom to leave the rounded end of the projection uninterrupted.

In the preferred form of invention shown, the outwardly turned flange 10 is embraced by the inwardly turned end 13 of the seat annulus 14, which latter extends into the mouth of the cup as at 15 to form a seat for the closure plate 16. The latter is formed with a rearwardly turned flange 17 which receives the forward end of a coil spring 18, the rear portion of which surrounds the inwardly projecting portion of the bottom and seats in the annular groove 19 surrounding said hump. The seat flange 14 also provides a stud-engaging wall or lip surrounding a stud-receiving aperture at the mouth of the cup so that a stud may be engaged with the socket.

In applying the socket to the metal support, such as 20, the latter is bored at 21 to form a hole of a diameter to fit about the exterior of the cup and the latter is thrust into the opening until the bead of the seat member rests against the face of the support as shown in Figs. 5 and 6. In order to expand the cup to hold it in its position, it is merely necessary to force the closure plate 16 rearwardly against the inwardly projecting hump of the bottom with sufficient force to press the latter rearwardly whereupon the cup is expanded in an obvious manner, the slots permitting it to yield until it arrives at the condition shown in Figs. 2, 3 and 7. Thus, the withdrawal or accidental displacement of the cup is prevented by the enlarged diameter thereof rearwardly of the opening in the support.

We claim:

1. In a device of the class described, a cup having an outwardly extending flange, a slotted annular wall and bottom, the slots terminating adjacent to the flange of the cup at one end and short of the center of the bottom at the other, the bottom projecting forwardly to form a hump within the cup, a seat member embracing said flange and projecting into the mouth of the cup, a closure plate normally engaging said seat and a spring intermediate the closure plate and the bottom of the cup.

2. A fastener socket having a cup slotted to permit lateral expansion, and a hump formed at the bottom of said cup and extending toward the mouth of the cup and a spring-pressed closure plate normally closing the open end of the cup but adapted when moved axially toward the hump to contact therewith and move the said hump axially of the cup to expand the side wall of the cup.

3. A snap fastener member having means for cooperative engagement with another snap fastener member, a cup-shaped attaching portion having a bottom and an annular side wall, a flange extending laterally outwardly from the said cup-shaped portion near the open end thereof and a hump provided in the bottom of the cup-shaped portion and extending toward the open end thereof, said hump being adapted to be moved axially to expand laterally the annular side wall of said cup-shaped portion thereby to secure said fastener member to a support and a closure element located within said snap fastener member and being adapted to be pressed upon to flatten said hump and expand said annular side wall.

4. A separable fastener element comprising a tubular portion having fastener engaging means adjacent to one end thereof, said tubular portion formed with a bottom at its other end, a hump extending inwardly from the bottom toward the fastener engaging means prior to attachment to a rigid support, and an axially movable closure element located within the fastener element and adapted when moved toward said means to distort the hump and expand the peripheral wall of the tubular portion, thereby to secure the fastener element to the support.

5. A snap fastener installation comprising, in combination, a support of substantially rigid material having an aperture therethrough, a snap fastener unit of complete assembly prior to attachment to said support, said snap fastener unit having an attaching portion comprising the sole means for securing said unit to the support, said attaching portion comprising a tubular portion passing into the aperture through said support and having a portion extending beyond the inner face of the support and provided with a bottom, apertured fastener-engaging means formed as a part of said unit and located at the front side of said support, a shoulder formed on said unit and engaging the front face of the support to prevent passage of the entire fastener unit through the aperture in said support, and means normally extending from the bottom of said attaching portion toward the aperture in said fastener-engaging means but being pressed away from said fastener-engaging means thereby expanding the wall of said tubular attaching means laterally beyond the inner face of the support positively to secure the fastener unit to the said support.

6. A snap fastener installation comprising, in combination, a support of substantially rigid material having an aperture therethrough, a snap fastener unit of complete assembly prior to attachment to said support, said snap fastener unit having a cup-shaped attaching portion comprising the sole means for securing said unit to the support, said cup-shaped attaching portion passing through the aperture in said support and having a hump flattened to expand that portion of the attaching portion which extends beyond the inner face of the support, thereby to secure the fastener unit to the support, apertured fastener-engaging means formed as a part of said unit and located at the front side of said support and a shoulder formed on said unit and engaging the front side of said support to prevent passage of the entire fastener unit through the aperture in said support.

7. A snap fastener installation comprising, in combination, a support of substantially rigid material having an aperture therethrough, a snap fastener unit of complete assembly prior to attachment to said support, said snap fastener unit having a cup-shaped attaching portion comprising the sole means for securing said unit to the support, said cup-shaped attaching portion passing through the aperture in said support and having a hump flattened to expand that portion of the attaching portion which extends beyond the inner face of the support, thereby to secure the fastener unit to the support, apertured fastener-engaging means formed as a part of said unit and located at the front side of said support, a shoulder formed on said unit and engaging the front side of said support to prevent passage of the entire fastener unit through the aperture in said support and closure means formed to prevent passage of dust, dirt, or moisture through the fastener unit to the inner side of the support.

ARTHUR W. KIMBELL.
CARL L. KNUTSON.